US006671012B1

(12) United States Patent
Tanaka

(10) Patent No.: US 6,671,012 B1
(45) Date of Patent: Dec. 30, 2003

(54) MOUNTING MEMBER FOR FIXING A DISPLAY PANEL TO A DISPLAY UNIT BODY

(75) Inventor: Yukinori Tanaka, Niigata (JP)

(73) Assignee: NEC Corporation, Tokyo (JP)

( * ) Notice: Subject to any disclaimer, the term of this patent is extended or adjusted under 35 U.S.C. 154(b) by 147 days.

(21) Appl. No.: 09/654,171

(22) Filed: Sep. 1, 2000

(30) Foreign Application Priority Data

Sep. 10, 1999 (JP) ............................................. 11-257653

(51) Int. Cl.[7] .............................................. G02F 1/1333
(52) U.S. Cl. ........................................ 349/58; 361/681
(58) Field of Search ............................. 349/58; 361/681

(56) References Cited

U.S. PATENT DOCUMENTS

| 5,768,095 A | * | 6/1998 | Nakamura et al. | ........... 361/681 |
| 5,835,139 A | * | 11/1998 | Yun et al. | ...................... 349/58 |
| 5,946,061 A | * | 8/1999 | Kurihara et al. | .............. 349/58 |
| 6,064,565 A | * | 5/2000 | Ishihara et al. | ............. 361/681 |

FOREIGN PATENT DOCUMENTS

| DE | 29721272 | * | 5/1998 |
| JP | 61-223877 | | 10/1986 |
| JP | 4-9984 | | 1/1992 |
| JP | 8-146269 | | 6/1996 |
| JP | 09200655 | * | 7/1997 |
| JP | 11-6998 | | 1/1999 |

* cited by examiner

Primary Examiner—Julie Ngo
(74) Attorney, Agent, or Firm—Sughrue Mion, PLLC

(57) ABSTRACT

To fix display panels such as LCD panels in various sizes and shapes to a common display unit body. Each of the left and right fixtures comprises fixture body, first fixing portions, and second fixing portions. Second fixing portions with through holes are formed at the position of projection portions of the display unit body. Therefore, screws are screwed into tapped holes of the projection portions through through holes, thereby fixing the fixtures to display unit body. Through holes of first fixing portions are formed at the positions of tapped holes of the display panel. Therefore, screws are screwed into tapped holes of the display panel through through holes, thereby fixing the fixtures to display panel. A plurality of fixtures are prepared for the display panel with various sizes and shapes.

16 Claims, 15 Drawing Sheets

DISPLAY UNIT 910

BODY OF PORTABLE INFORMATION TERMINAL 900

MOUNTING MEMBER FOR FIXING A DISPLAY PANEL TO A DISPLAY UNIT BODY

BACKGROUND OF THE INVENTION

1. Technical Field of the Invention

The present invention relates to a mounting member for a display panel such as a liquid crystal display (LCD) panel in portable information terminals, and particularly to a fixture which can fix the display panel to an arbitrary position.

2. Description of the Prior Art

A note personal computer, hand-held computer and mobile computer belong to the personal information terminals. For example, a note personal computer as shown in FIG. 14 comprises main body 900 including main electronic parts, and display unit 910 for displaying communication information.

Further, display unit 910 comprises display unit cover 911, display unit body 912, and display panel 913 such as a LCD panel.

Furthermore, display unit body 912 includes fixing surface 914 for fixing display panel 913.

Display panel 913 is fixed to display unit body 912, by using fixing members such as screws, pins, or rivets.

Concretely, as shown in FIGS. 15 and 16, flange portions 917 with through holes 916 are formed on display panel 913, while projection portions 918 with tapped holes are formed on display unit body 912. Then, screws 915 are screwed in projection portions 918 through through holes 916. Thus, display panel 913 is fixed to display unit body 912.

Alternatively, non-shown tapped holes may be formed on the walls of display panel 913, while through holes may be formed on the side walls of display unit body 912.

Further, the side walls of the LCD panel disclosed in JP 11-6998 (A) (1999) are provided with planar projection portion which are apart from the side walls and are parallel to the side walls.

The supporting member for the above-mentioned LCD panel comprises first portions for fixing the LCD panel and second portions for fixing the display unit body. Each of the first portions is provided with a projection portion which can be inserted into the space between the side wall and the planar projection portion of the LCD panel. Such a structure is mechanically strong.

However, the LCD panel can not be fixed to the display unit body, when the positions of the holes on the flange portions do not coincide with the positions of the tapped holes of the projection portions of the display unit body.

Further, when the tapped holes on the walls of LCD panel 913 are employed together with the holes formed on the side walls of display unit body 912, it is difficult to assemble display panel 913 and display unit body, because the direction of insertion of display panel 913 into display unit body is perpendicular to the screwing direction.

Further, the side walls of the LCD panel disclosed in JP 11-6998 (A) (1999) are provided with planar projection portion which are apart from the side walls and are parallel to the side walls.

The supporting member for the above-mentioned LCD panel comprises first portions for fixing the LCD panel and second portions for fixing the display unit body. Each of the first portions is provided with a projection portion which can be inserted into the space between the side wall and the planar projection portion of the LCD panel. Such a structure is mechanically strong.

Further, when the planar projection portion with through hole as disclosed in JP 11-6998 (A) (1999) are formed along the side walls of the LCD panel, it is difficult to go through the screw into the tapped hole of the projection portion of the display unit body. Further, the position of inserting LCD panel is limited, because the insertion position is the projection portion of the display unit body.

Therefore, the fixture disclosed in JP 11-6998 (A) (1999) is not applicable for a LCD panel which is smaller or greater then the display unit body. In general, the positions and directions of the tapped holes are diversified, depending upon the shapes of the LCD panel.

SUMMARY OF THE INVENTION

An object of the present invention is to provide a display unit body which can be commonly used for various types of the LCD panels Another object of the present invention is to facilitate the assembling procedures, by making the insertion direction of LCD panel parallel to the screwing direction.

The fixtures for display panel of the present invention are manufactured, in accordance with the positions of the fixing portion of the display unit body and with the sizes and shapes of the display panel such as LCD panel. The display panel is fixed to the display unit body by using a selected fixture.

Therefore, the display panel is fixed to the display unit body, even when the positions of the fixing portions of the display panel do not coincide with the positions of the fixing portions of the display unit body.

Further, a plurality of display panels with various sizes and shapes are fixed to a common display unit body, by selecting a suitable fixture.

Concretely, the fixture of the present invention comprises a fixture body and first fixing portions formed on the fixture body. The first fixing portions are applied to the fixing positions of the display panel.

Further, the fixture of the present invention may includes a container portion for wires, electronic parts, or antenna, thereby utilizing the inside space of the portable information terminals. The portable information terminals are minitualized by employing the fixture with the container portion.

Further, the fixture with the container portion may comprises first fixing portions applied to the fixing places of the display panel, and second fixing portion applied to the fixing places of the display unit body. The fixture body is placed on the surface of the display unit body. The first and second fixing portions are supported by supporting members perpendicular to the fixture body which is placed on or along the surface of the display unit body.

Further, the fixture body may be fixed to the display unit body by a fixing member. Here, the direction of putting the display panel on the display unit body is the direction of fixing the fixture body to the display unit body, thereby facilitating the assembling.

The fixing member may be a screw. In this case, through holes are formed on the first and second fixing portions, while tapped holes are formed on the display panel and display unit body.

According to the present invention, the display panel with various sizes and shapes can be fixed to the display unit body, by selecting a suitable fixture.

Further, according to the present invention, various needs of users can be coped with, and manufacturing cost can be reduced, because the size and shape of the display unit body is common, regardless of the sizes and shapes of the display panel.

Furthermore, the assembling is facilitated, when the direction of putting the display panel into the display unit body

PREFERRED EMBODIMENT OF THE INVENTION

First Mode of Embodiment

Figure 1:
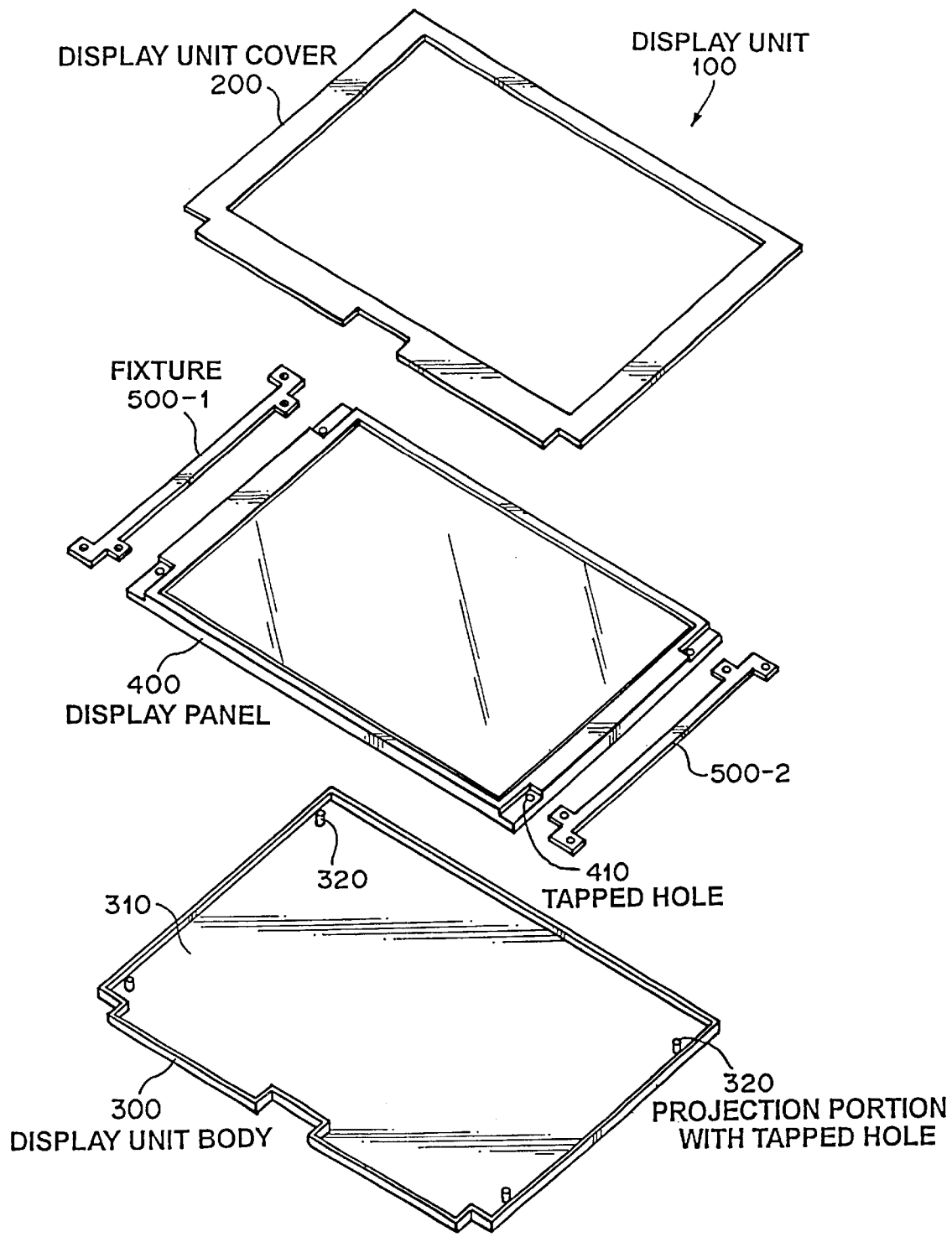
FIG. 1 is an exploded view of a portable information terminal in the first mode of embodiment of the present invention.
Figure 2:
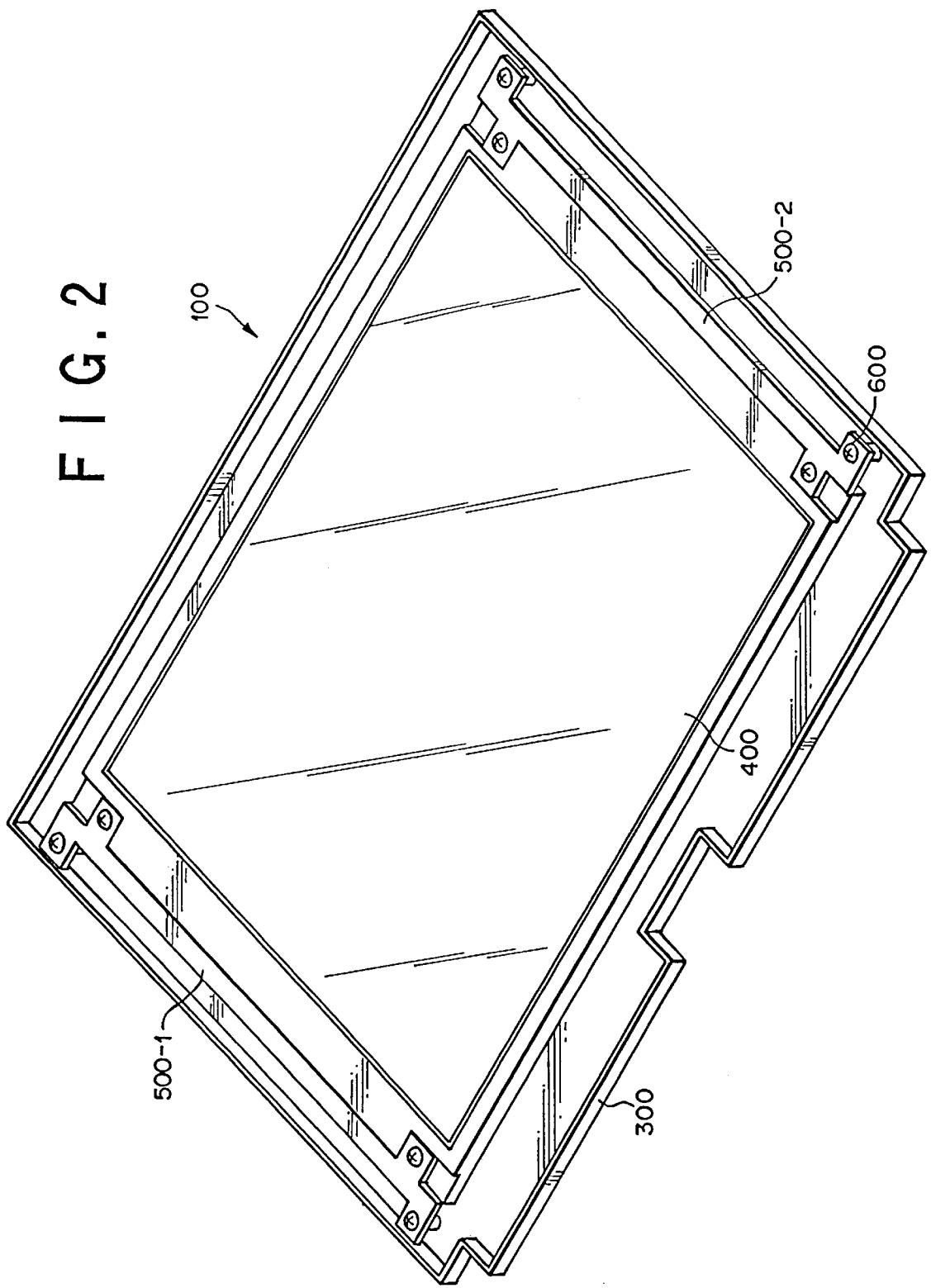
FIG. 2 is an assembled view of a display panel and display unit body in the first mode of embodiment.
Figure 3:
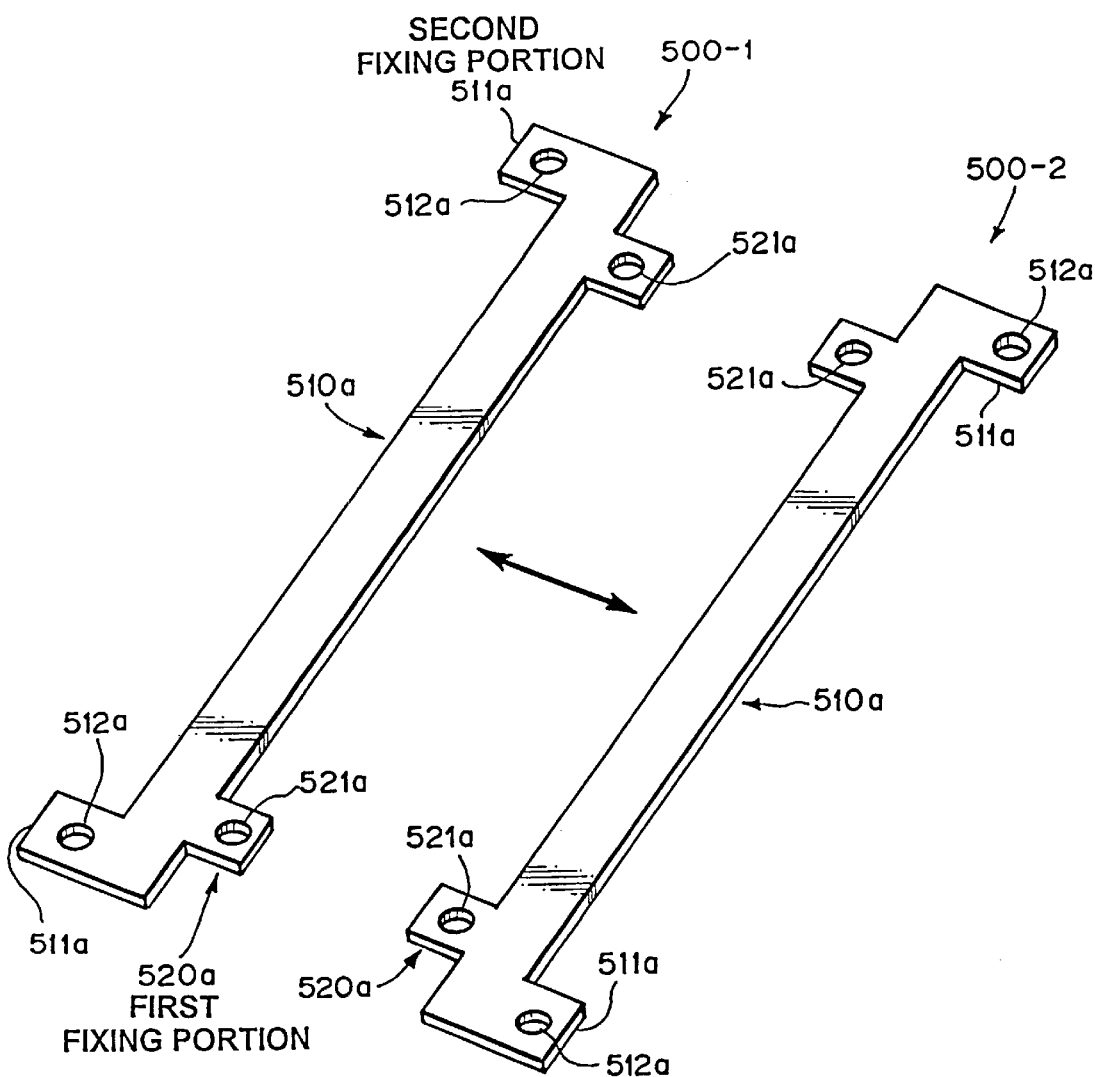
FIG. 3 is a perspective view of the fixtures in the first mode of embodiment of the present invention.

As shown in FIGS. 1 and 2, display unit 100 of a portable information terminal comprises display unit cover 200 for protecting the front panel of a display panel such as the display unit body 300, display panel 400, fixtures 500-1 and 500-2 for fixing display panel 400 to display unit body 300, and screws 600 as shown in FIG. 2 for fixing fixtures 500-1 and 500-2.

On the four corners of surface 310 of display unit body 400, projection portions 320 are formed. The positions of projection portions are symmetrical with reference to the horizontal and vertical center lines of surface 310. Further, a tapped hole is formed in the direction almost perpendicular to surface 310 on each of projection portions 320.

Tapped holes 410 are formed on the four corners of display panel 400, thereby fixing fixtures 500-1 and 500-2 to display panel 400 by using screws 600 as shown in FIG. 2. Here, the positions of tapped holes 410 are symmetrical with reference to the horizontal and vertical center lines of the display surface of display panel 400.

Fixtures 500-1 and 500-2 are a left fixture and right fixture for the left hand side and right hand side of display panel, respectively. Fixtures 500-1 and 500-2 comprises fixture bodies 510a, first fixing portions 520a, and second fixing portions 511a. Fixtures 500-1 and 500-2 may be fixed to the upper and lower part of display panel 400.

Second fixing portions 511a with through holes 512a is formed at the position of projection portions 320. Therefore, screws 600 are screwed in to tapped holes of projection portions 320 through through holes 512a, thereby fixing fixtures 500-1 and 500-2 to display unit body 300.

Through holes 521a of first fixing portions 520a are formed at the positions of tapped holes 410. Therefore, screws 600 are screwed in to tapped holes 410 of display panel 400 through through holes 521a, thereby fixing fixtures 500-1 and 500-2 to display panel 400.

Thus, the separations between tapped holes 410 are equal to the separations between the tapped holes of projection portions 320. Further, fixtures 500-1 and 500-2 are employed, when tapped holes 410 are apart from projection portions 320.

The shape of fixtures 500-1 and 500-2 are symmetrical, because the positions of projection portions 320 as well as the positions of tapped holes 410. Therefore, manufactures have only to manufacture either of the left fixture 500-1 or right fixture 500-2.

The material of fixtures 500-1 and 500-2 for the portable information terminal may be hard and light material such as metals or hardened plastics.

Further, the thickness of fixtures 500-1 and 500-2 may be changed for secure a mechanical strength, depending upon the position, although it is preferable that fixtures 500-1 and 500-2 are as thick as possible.

Next, a method for fixing display panel 400 to display unit 400, by using fixtures 500-1 and 500-2. Various sizes and forms of fixtures 500-1 and 500-2 are prepared, depending upon the sizes and forms of display panel 400.

Then, suitable fixtures 500-1 and 500-2 are selected for display panel to be fixed.

Selected fixtures 500-1 and 500-2 are fixed to display panel 400 by screws 600 which are screwed into tapped holes 410 of display panel 400 through through holes 521a of first fixing portion 520a.

Further, display panel with fixtures 500-1 and 500-2 is fixed to display unit body 300 by screws 600 which are screwed into tapped holes of projection portions 320 of display unit body 300 through through holes 512a of second fixing portion 511a.

Thus, various display panels 400 are fixed on display unit body 400 of a single common size and shape.

Further, the assembling procedures are facilitated, because the screwing directions are the same in every assembling steps.

Second Mode of Embodiment

Figure 4:
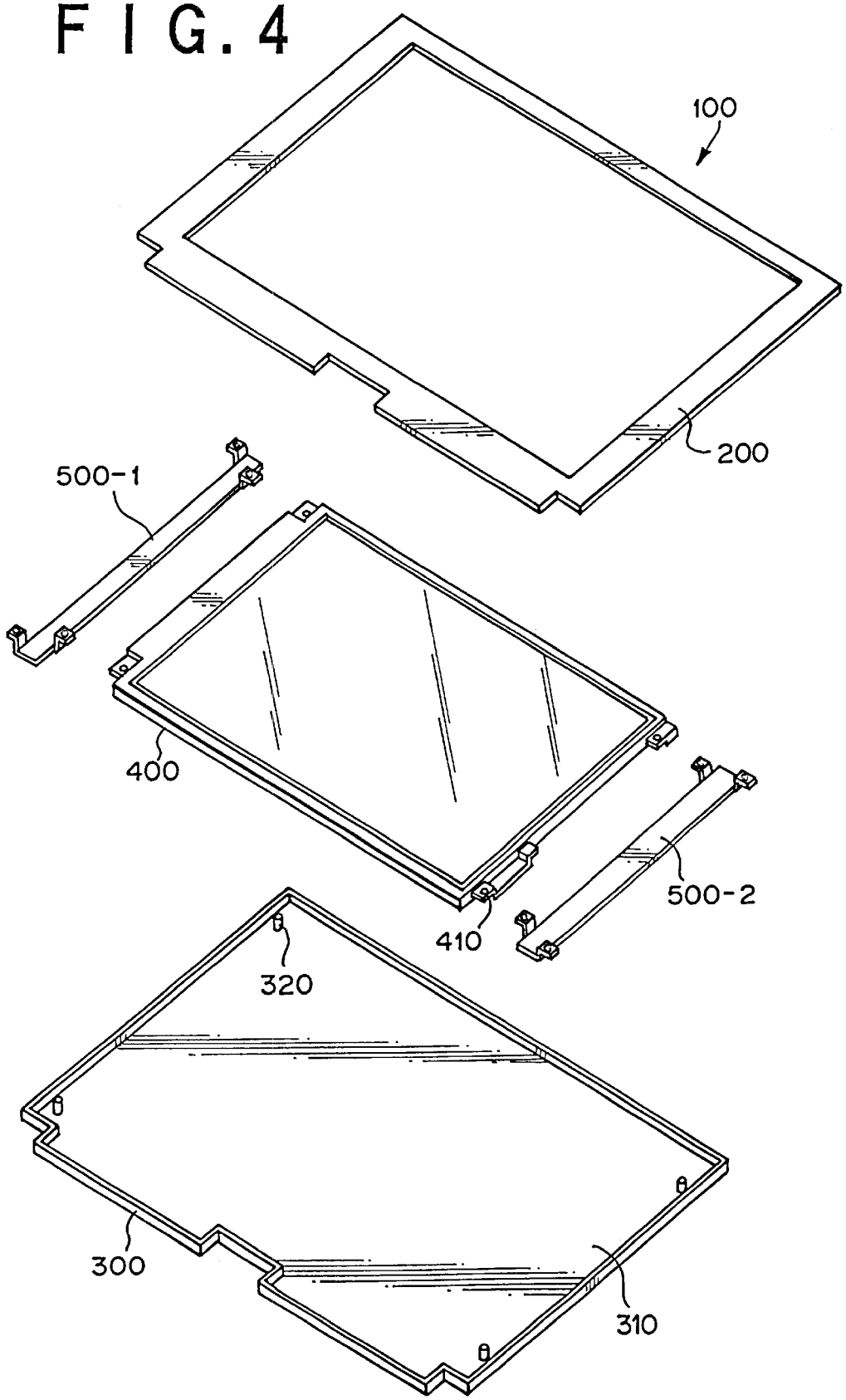
FIG. 4 is an exploded view of a portable information terminal in the second mode of embodiment of the present invention.
Figure 5:
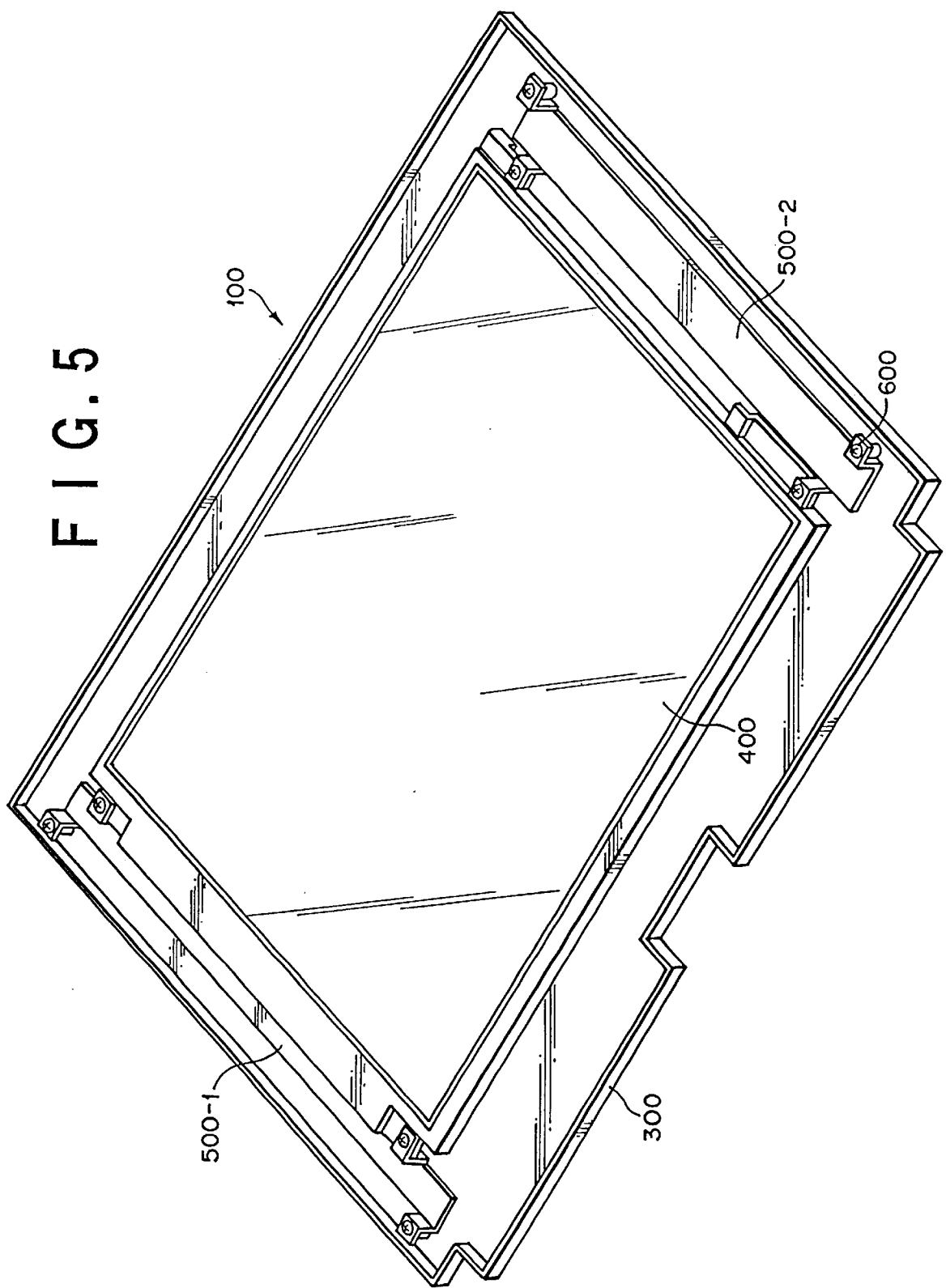
FIG. 5 is an assembled view of a display panel and display unit body in the second mode of embodiment.
Figure 6:
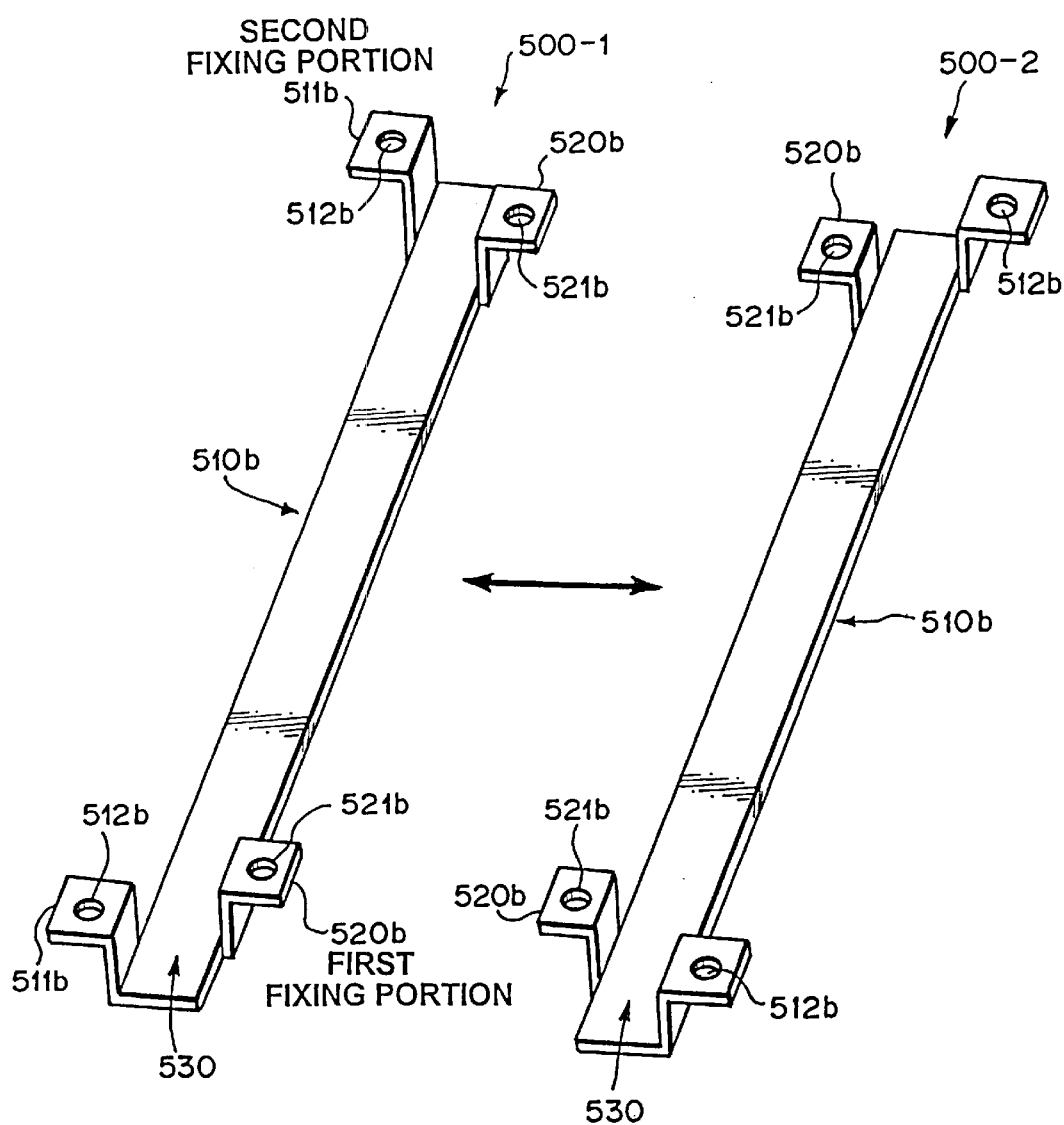
FIG. 6 is a perspective view of the fixtures in the second mode of embodiment of the present invention.

The second mode of the present invention is explained, referring to FIGS. 4, 5 and 6. The explanations of the elements with the same reference numerals as in FIGS. 1 and 2 are omitted.

As shown in FIGS. 4 and 5, display unit 100 of a portable information terminal comprises display unit cover 200 for protecting the front panel of a display panel such as the LCD panel, display unit body 300, display panel 400, fixtures 500-1 and 500-2 for fixing display panel 400 to display unit body 300, and screws 600 as shown in FIG. 2 for fixing fixtures 500-1 and 500-2.

Fixtures 500-1 and 500-2 are a left fixture and right fixture for the left hand side and right hand side of display panel, respectively.

As shown in FIG. 6, fixtures 500-1 and 500-2 comprise fixture bodies 510b, first fixing portions 520b, and second fixing portions 511b.

Further, as shown in FIG. 6, at first fixing portions 520b, through holes 521b are formed at the position of tapped holes 410 of display panel 400.

Further, as shown in FIG. 6, at second fixing portions 511b, through holes 512b are formed at the position of projection portions 320.

First and second fixing portions 520b and 511b are placed at places higher than the surface of fixture bodies 510b.

Fixtures 500-1 and 500-2 are employed, when tapped holes 410 are apart from projection portions 320.

The space between first fixing potion 520b and second fixing portion 511b becomes container portion 530.

Container portion 530 may contains wires, antenna, and electronic parts. Therefore, the inside space is utilized effectively, thereby providing smaller portable information terminals.

Fixture body 510b may be of a square bar or pipe as well as a plate. The inside space of the pipe may be used also as the container.

The method of fixing display panel 400 to display unit body 300 is the same as in the first mode of embodiment.

Third Mode of Embodiment

The third mode of the present invention is explained, referring to FIGS. 7 to 10. The explanations of the elements with the same reference numerals as in FIGS. 1 and 2 are omitted.

Figure 7:
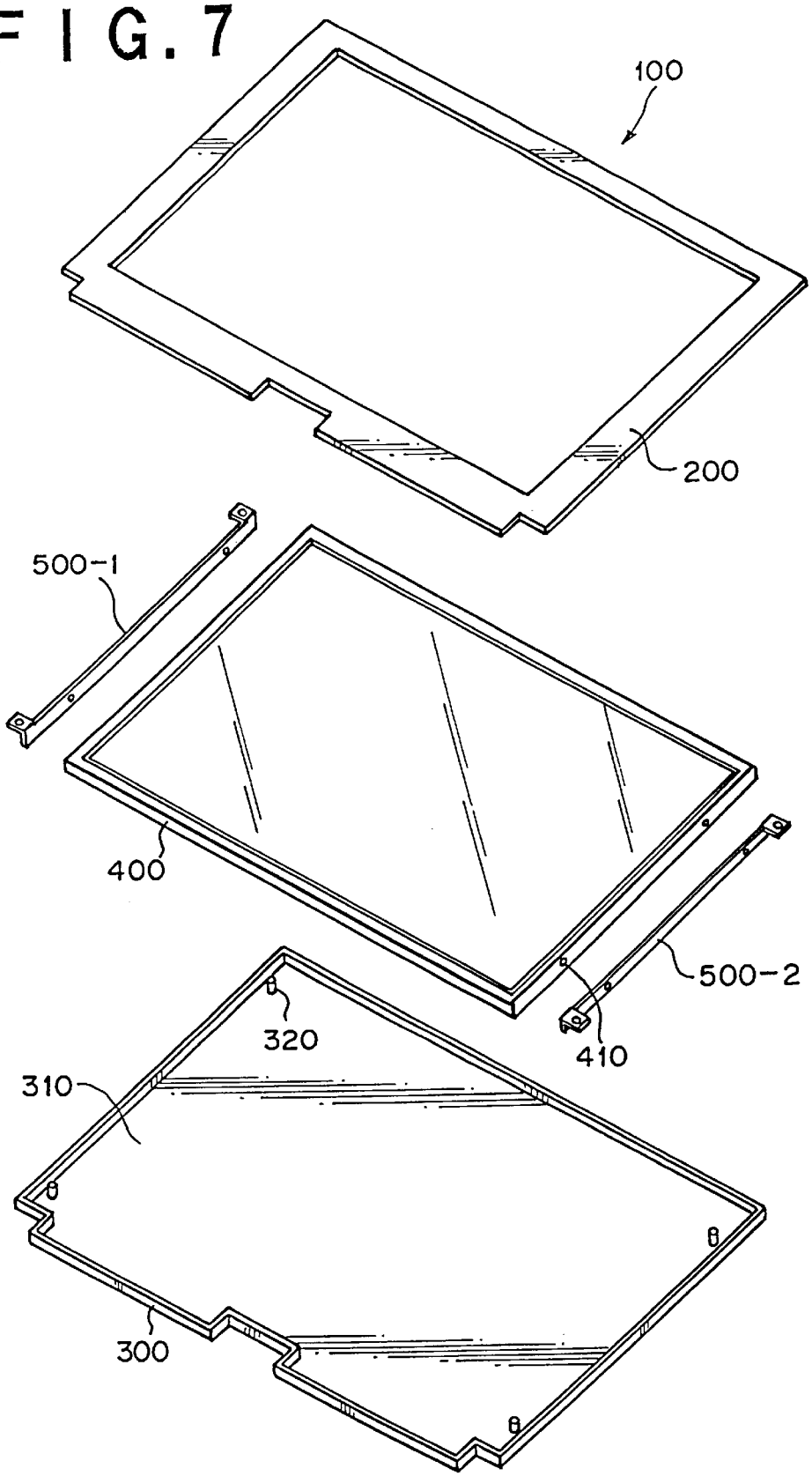
FIG. 7 is an exploded view of a portable information terminal in the third mode of embodiment of the present invention.
Figure 8:
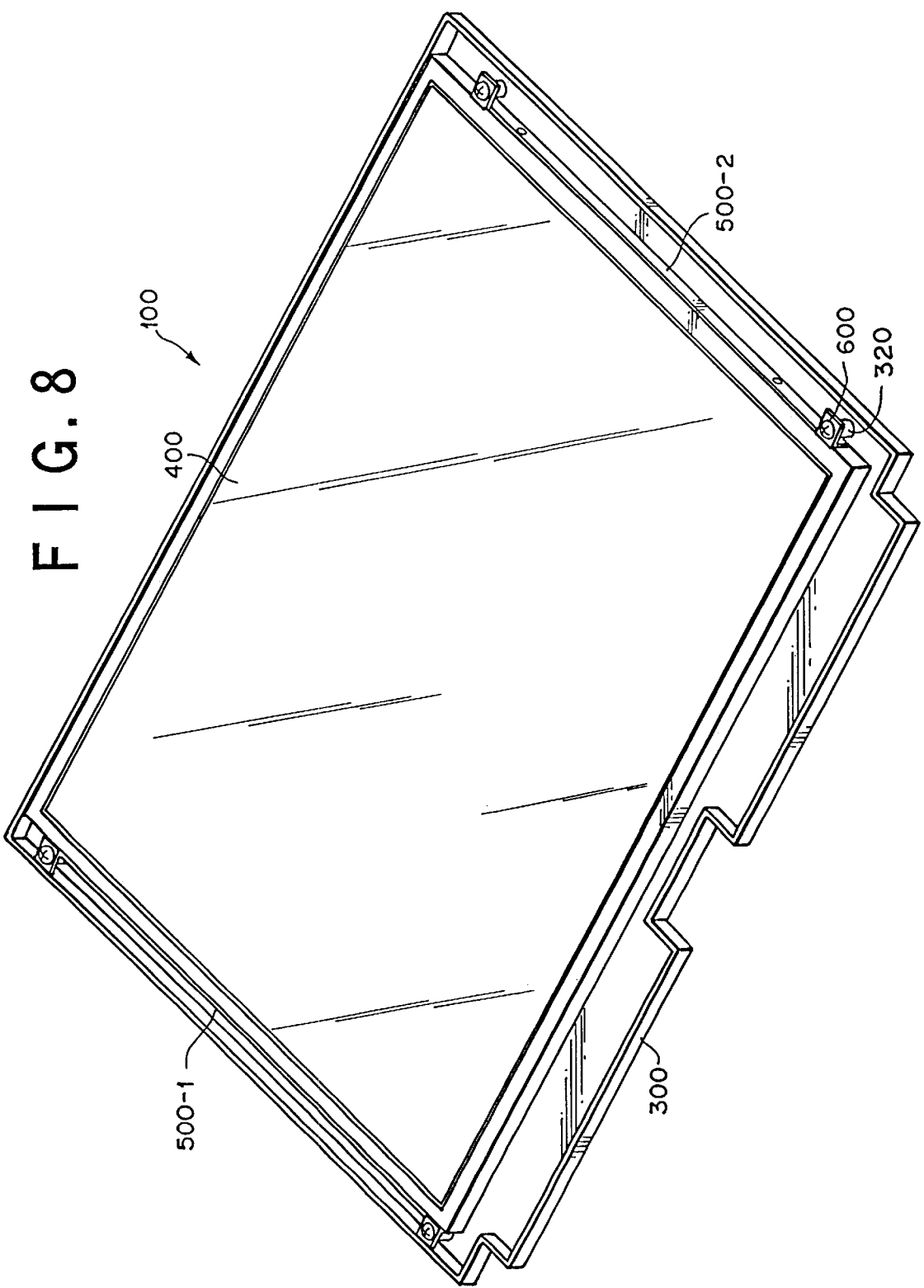
FIG. 8 is an assembled view of a display panel and display unit body in the third mode of embodiment.

As shown in FIGS. 7 and 8, display unit 100 of a portable information terminal comprises display unit cover 200 for protecting the front panel of a display panel such as the LCD panel, display unit body 300, display panel 400, fixtures 500-1 and 500-2 for fixing display panel 400 to display unit body 300, and screws 600 as shown in FIG. 2 for fixing fixtures 500-1 and 500-2.

As shown in FIG. 7, tapped holes 410 are formed on the side walls of display panel 400.

Figure 9:
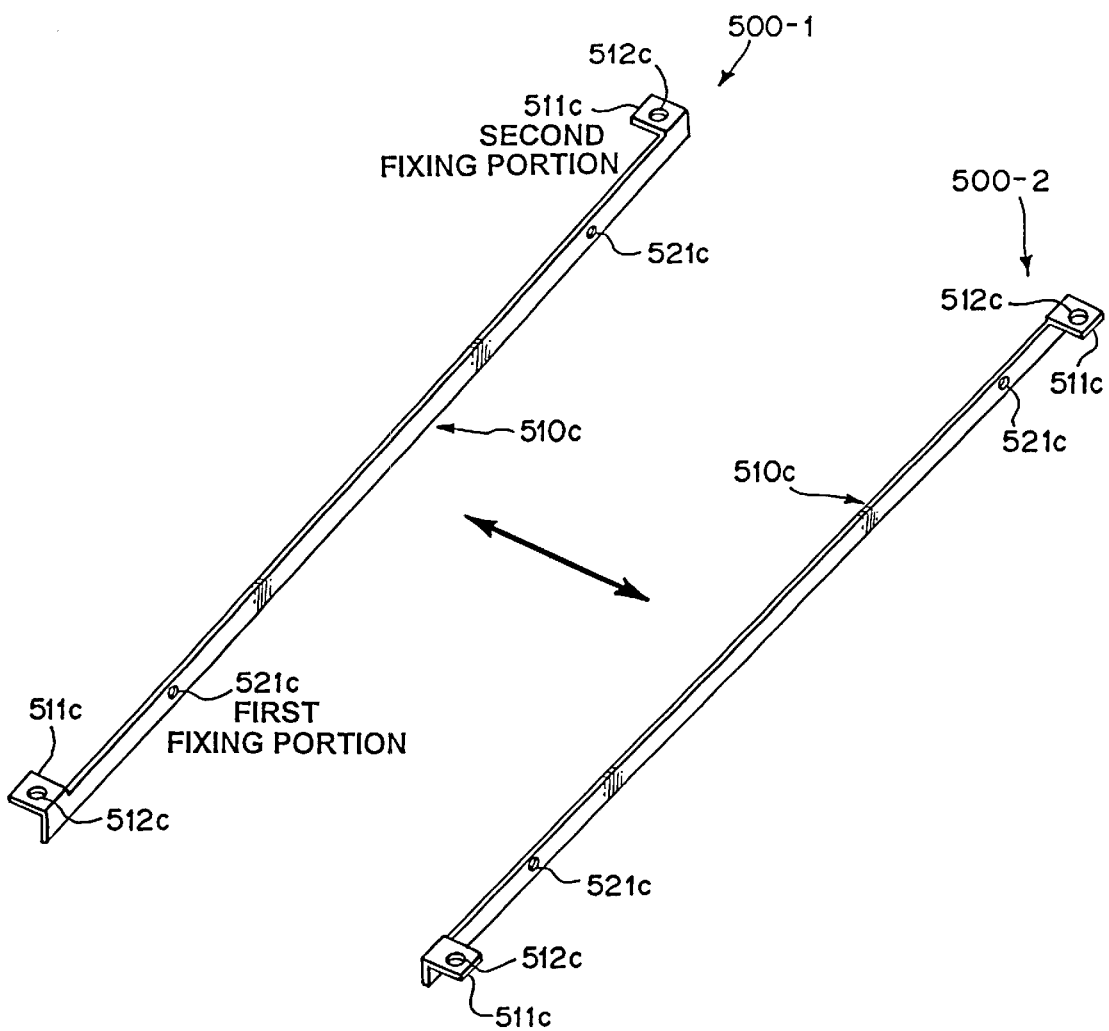
FIG. 9 is a perspective view of the fixtures in the third mode of embodiment of the present invention.

Further, as shown in FIG. 9, fixtures 500-1 and 500-2 comprise fixture bodies 510c, first fixing portions or through holes 521c, and second fixing portions 511c.

Therefore, screws 600 are screwed in the direction perpendicular to that of putting display panel 400 into display unit body 300.

At second fixing portions 511c, through holes 512c are formed at the position of projection portions 320. The surfaces of second fixing portions 520c projected from fixture bodies 510c are perpendicular to the surfaces of fixture bodies 510c.

Fixtures 500-1 and 500-2 as shown in FIG. 9 are employed, when the directions of tapped holes 410 of display panel 400 are perpendicular to the direction of tapped holes of projection portions 320 of display unit body 300.

Second fixing portion 511c should be extended, when display panel is small. In this case, second fixing portion 511c should be mechanically strong.

Figure 10:
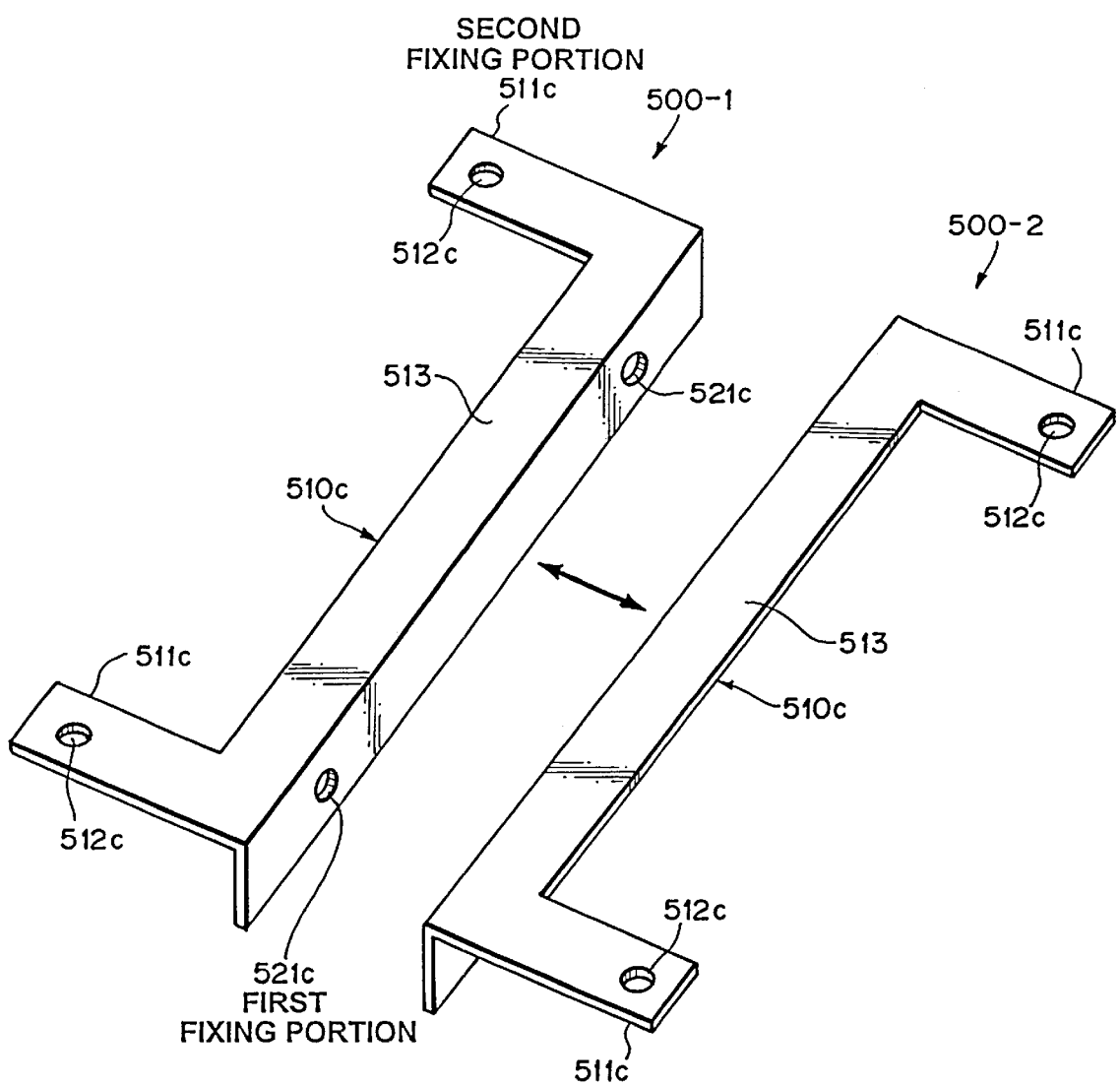
FIG. 10 is a perspective view of another fixtures in the third mode of embodiment of the present invention.

As shown in FIG. 10, reinforcement portion 513 is introduced into second fixing portion 511c.

The shape of reinforcement portion 513 is not limited to the combination of rectangles as shown in FIG. 10, as far as the mechanical strength is guaranteed.

Thus, display panel 400 is fixed to display unit body with sufficient mechanical strength, even when tapped holes 410 are distant from projection portions 320.

The method of fixing display panel 400 to display unit body 300 in the third mode of embodiment is the same as in the first mode of embodiment.

Fourth Mode of Embodiment

Figure 11:
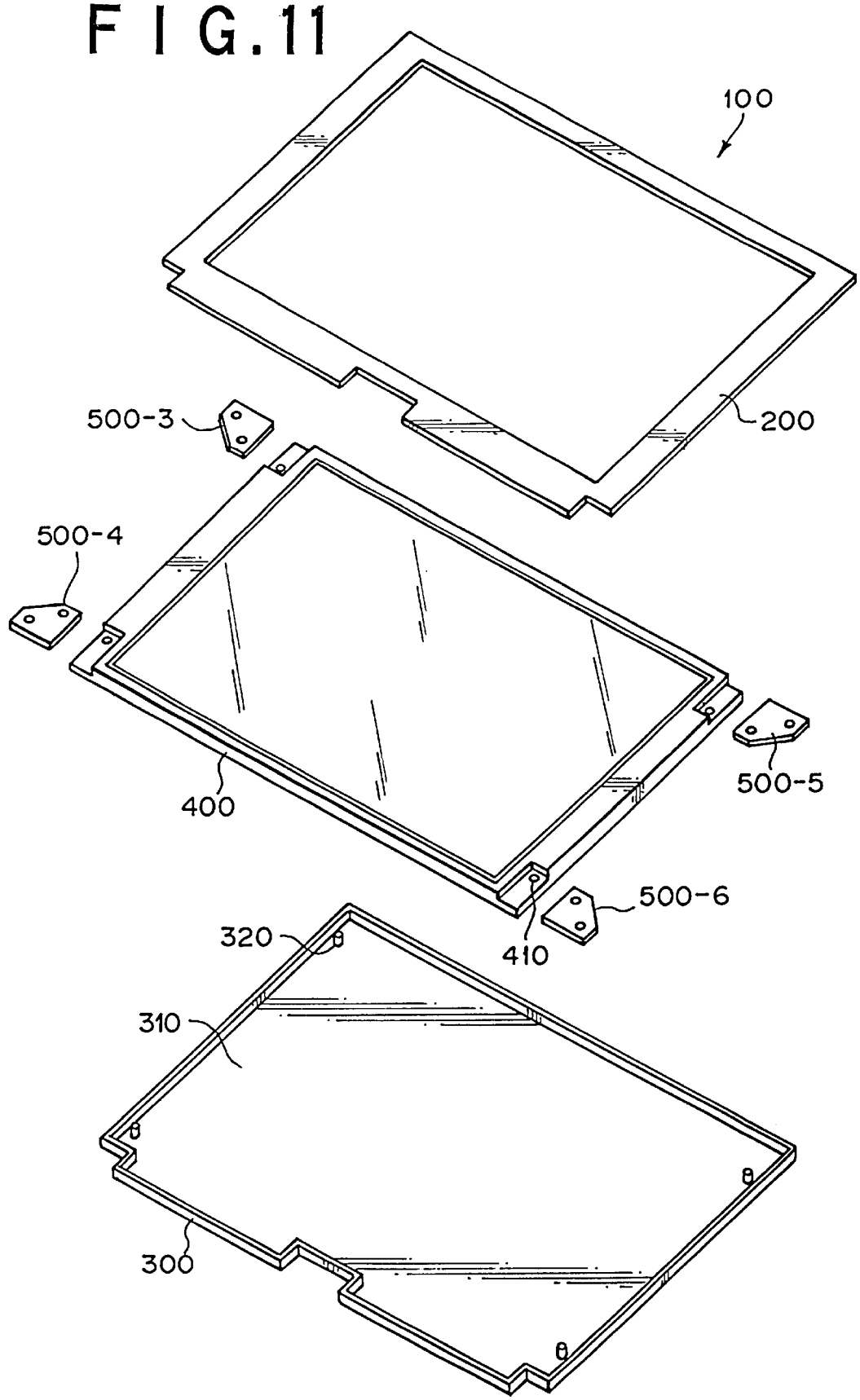
FIG. 11 is an exploded view of a portable information terminal in the fourth mode of embodiment of the present invention.
Figure 12:
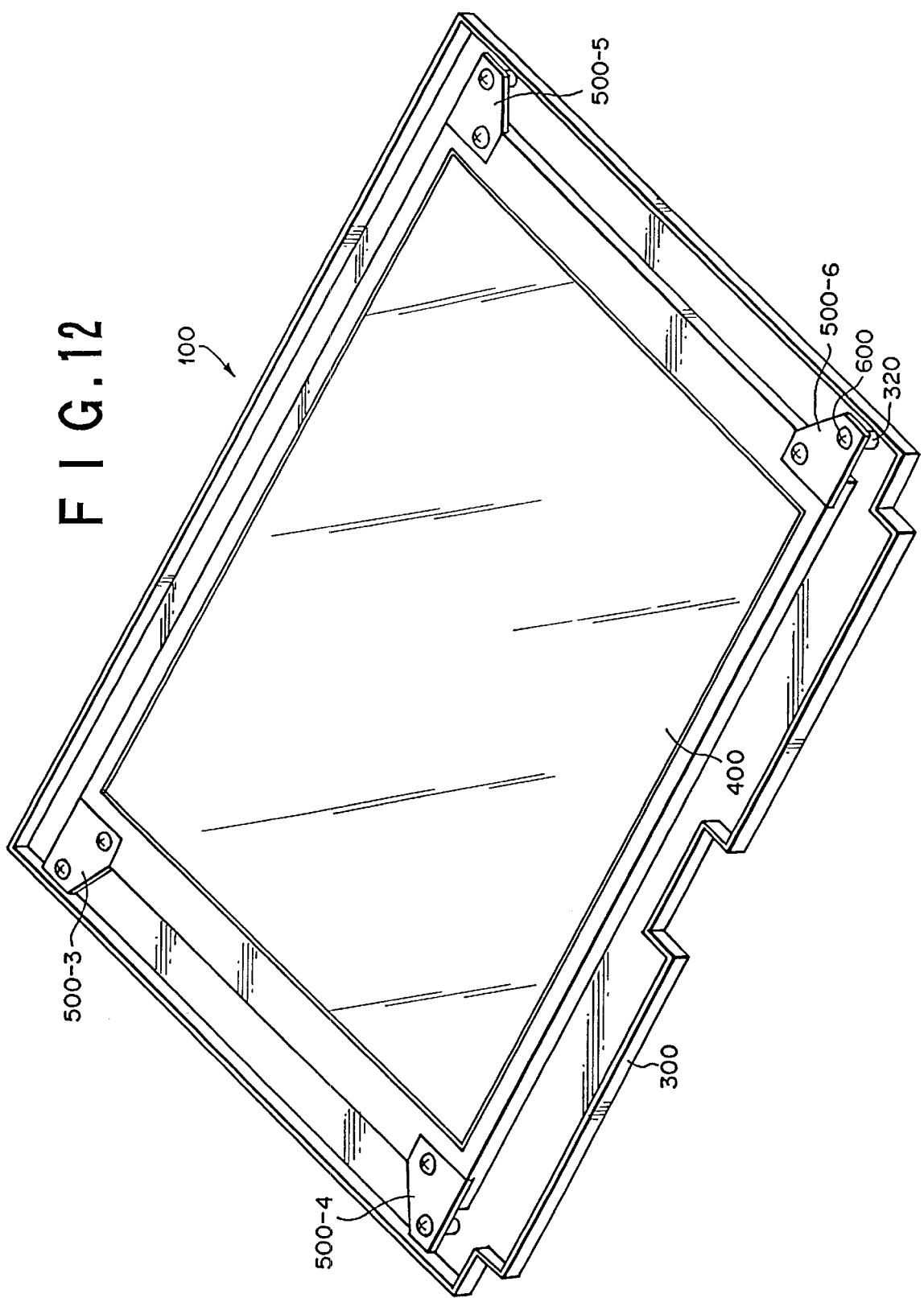
FIG. 12 is an assembled view of a display panel and display unit body in the fourth mode of embodiment.
Figure 13:
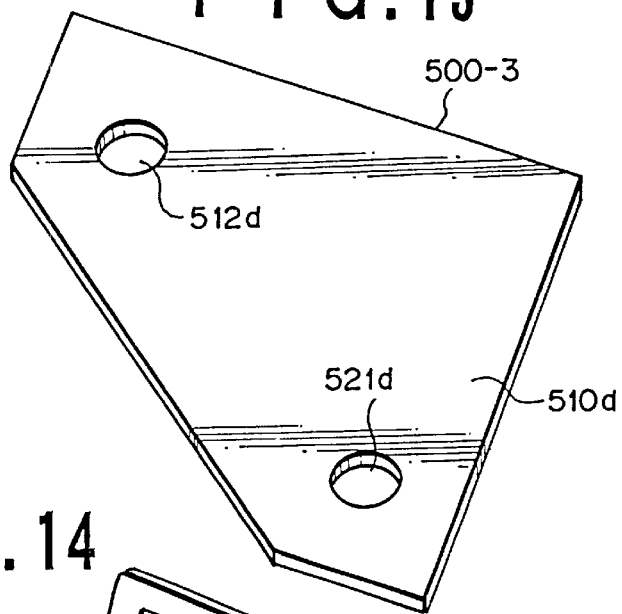
FIG. 13 is a perspective view of the fixtures in the fourth mode of embodiment of the present invention.
Figure 14:
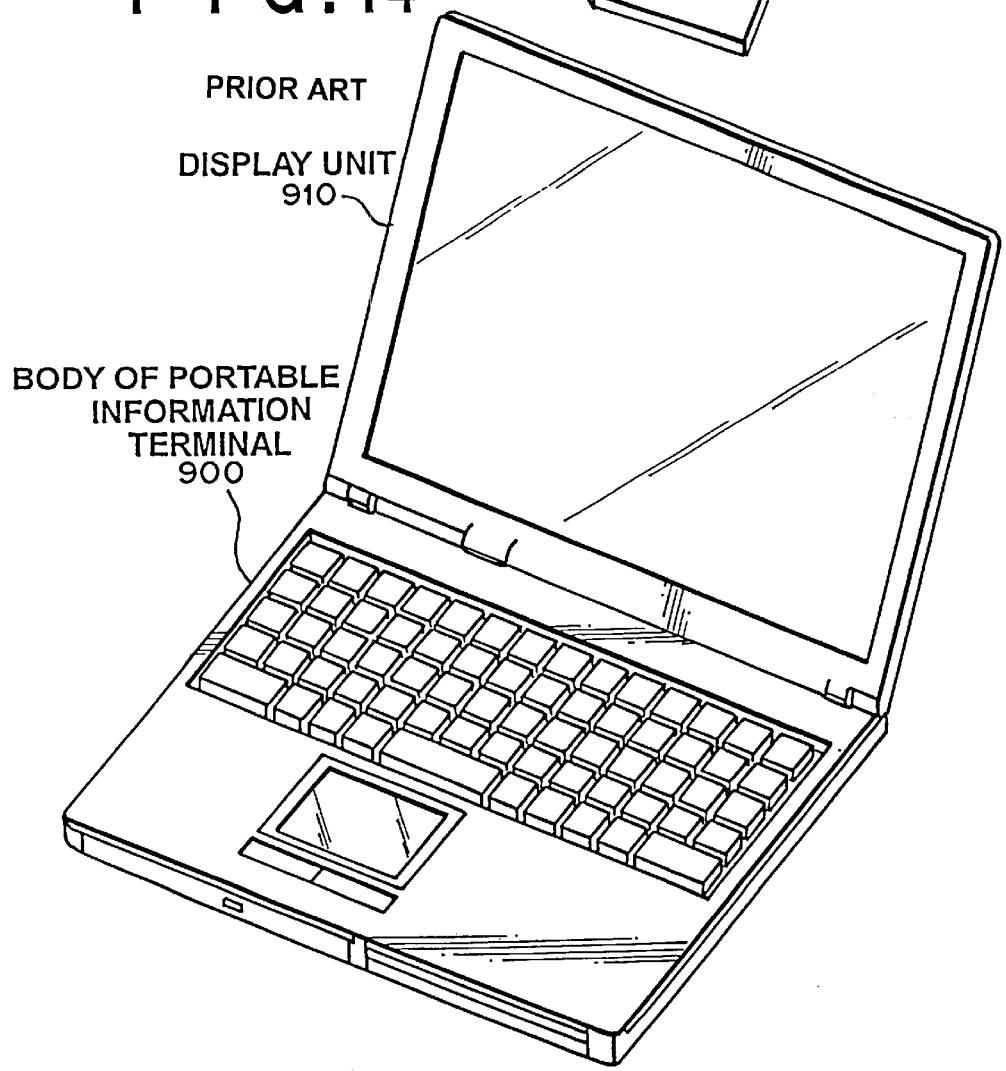
FIG. 14 is a perspective view of an example of a portable information terminal.
Figure 15:
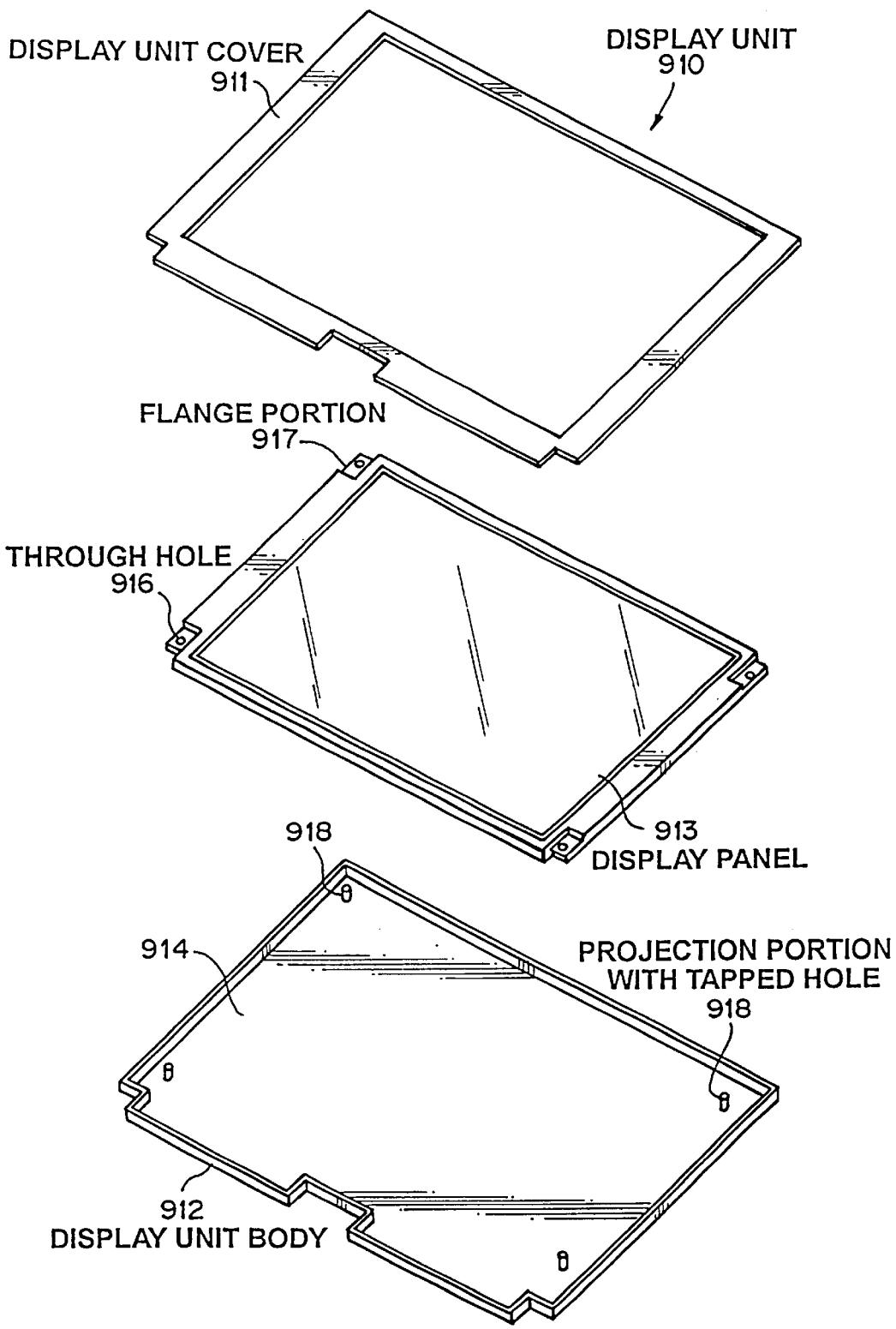
FIG. 15 is an exploded view of a conventional portable information terminal.
Figure 16:
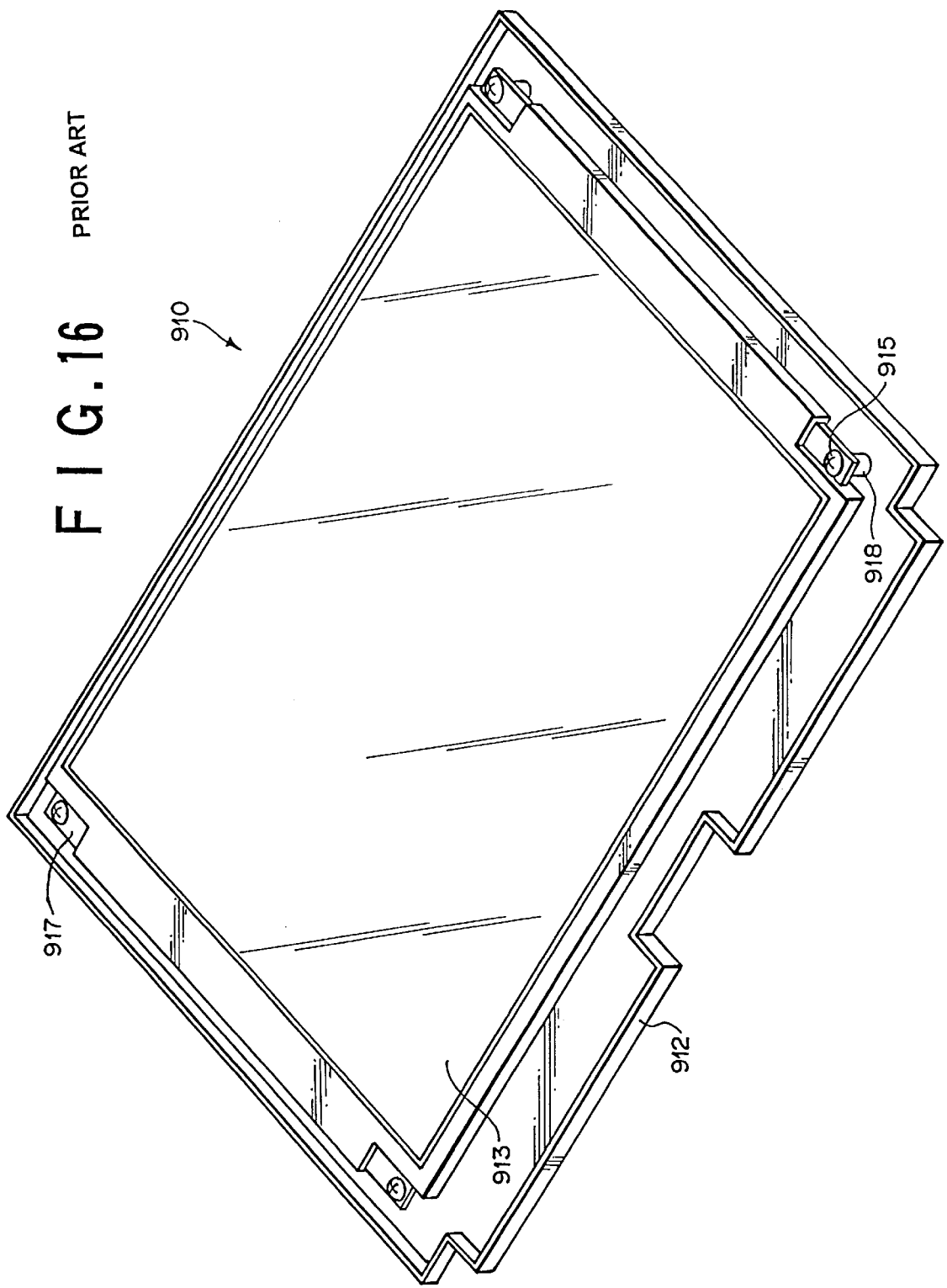
FIG. 16 is an assembled view of a display panel and display unit body in the example as shown in FIG. 15.

The fourth mode of the present invention is explained, referring to FIGS. 11, 12 and 13. The explanations of the elements with the same reference numerals as in FIGS. 1 and 2 are omitted.

As shown in FIGS. 11 and 12, display unit 100 of a portable information terminal comprises display unit cover 200 for protecting the front panel of a display panel such as the LCD panel, display unit body 300, display panel 400, fixtures 500-3, 500-4, 500-5 and 500-6 for fixing display panel 400 to display unit body 300, and screws 600 as shown in FIG. 2 for fixing fixtures 500-3 to 500-6.

As shown in FIG. 11, tapped holes 410 are formed on the side walls of display panel 400.

Further, as shown in FIG. 13, fixture 500-3 as well as fixtures 500-4 to 500-6 comprises fixture body 510d, first fixing portion or through hole 521d, and second fixing portions 512d.

Fixtures 500-3 to 500-6 are of the identical shapes, because projection portions 320 of display unit body 300 as well as tapped holes 410 of display panel 400 are formed in bilateral symmetry.

Therefore, the manufactures have only to manufacture fixtures of a shape.

Further, Fixture 500-3 as well as 500-4 to 500-6 is light in weight. Therefore, the material cost is reduced, and the portable information terminal becomes light.

Further, the fixtures in the fourth mode of embodiment are easily fabricated, because their shapes are simple. Further, a lot of the fixtures are stored in a warehouse, because they are small.

The method of fixing display panel 400 to display unit body 300 in the fourth mode of embodiment is the same as in the first mode of embodiment.

The present invention is not limited to the four modes of embodiment as explained above.

Projection portions 320 as well as tapped holes 410 may be less than or more than 4. In this case, a plurality of the fixtures are prepared, in accordance with the number of projection portions 320 as well as tapped holes 410.

The shape of display panel may be, for example, square, circle, triangle, polygon. In this case, the shape of the fixture is decided, depending upon the shape of display panel.

What is claimed is:

1. A mounting member for fixing a selected one of plural display panels which have different sizes to a display unit body, said mounting member comprising:
   fixtures prepared for every one of the plural display panels, wherein each of said fixtures has:
   a fixture body which is fixed to the display unit body;
   first fixing portions formed on said fixture body corresponding to a position of a fixing portion of the selected one of plural display panels; and
   second fixing portions formed on said fixture body corresponding to a position of a fixing portion of the display unit body;

wherein said selected one of plural display panels is fixed to said display unit body by said fixtures.

2. The mounting member for a display panel according to claim 1, wherein each of said fixtures comprises:
   a fixture body which is fixed to said display unit body; and
   first fixing portions formed on said fixture body which are applied to fixing positions of said display panel.

3. The mounting member according to claim 2 wherein:
   said fixture body is fixed to said display unit body on or along a surface on which said selected one of plural display panels is mounted;
   said first fixing portions are formed on one side of said fixture body;
   said second fixing portions are formed on another side of said fixture body; and
   said container portion is provided in a space between said first fixing portions and said second fixing portions.

4. The mounting member according to claim 1, wherein:
   said fixture body is fixed to said selected one of plural display panels and to said display unit body by fixing members; and
   the direction of fixing said fixture body to said display unit body is the direction of putting said selected one of plural display panels into said display unit body.

5. The mounting member according to claim 4 wherein:
   said fixing members are screws; and
   said first and second fixing portions are provided with through holes for said screws, while said selected one of plural display panels and said display unit body are provided with tapped holes for said screw.

6. A mounting system for a display panel comprising:
   a display panel;
   a display unit body; and
   a plurality of fixtures individually supporting said display panel on said display unit body, wherein:
      said fixtures extend laterally between said display panel and said display unit body; and
   said fixtures are formed in accordance with sizes and shapes of said display panel and said display unit body.

7. The mounting system for a display panel according to claim 6 wherein:
   said display panel comprises at least one tapped hole on the surface of said display panel;
   said display unit body comprises at least one tapped hole on the surface of said display unit body that is not coaxial with said tapped hole on the surface of said display panel;
   one of said plurality of fixtures extends between said tapped hole on the surface of said display unit body and said tapped hole on the surface of said display panel.

8. The mounting system for a display panel according to claim 6, wherein each of said plurality of fixtures comprises:
   at least one first fixing portion connected to said display panel;
   at least one second fixing portion connected to said display unit body; and
   a fixture body which supports and connects said first fixing portion and said second fixing portion.

9. The mounting system for a display panel according to claim 8, wherein said fixture body further comprises a container portion for containing antenna, wires, or electronic parts.

10. The mounting system for a display panel according to claim 9, wherein said container portion is disposed between said first fixing portion and said second fixing portion.

11. The mounting system for a display panel according to claim 8, wherein each of said plurality of fixtures further comprises:
   first supporting members disposed between said first fixing portion and said fixture body;
   second supporting members disposed between said second fixing portion and said fixture body; and
   a container portion for containing antenna, wires, or electronic parts.

12. The mounting system for a display panel according to claim 11, wherein said container portion is disposed between said first supporting members and said second supporting members.

13. The mounting system for a display panel according to claim 8, wherein each of said plurality of fixtures is connected to said display unit body by a fixing member; and the fixing member is installed in the same direction that said display panel is installed into said display unit body.

14. The mounting system for a display panel according to claim 13, wherein:
   said fixing member is a screw; and
   said first fixing portion and said second fixing portion are each provided with a through hole for said screw, while said display panel and said display unit body are provided with tapped holes for said screw.

15. The mounting system for a display panel according to claim 8, wherein each of said plurality of fixtures is connected to said display unit body by a fixing member; and the fixing member is installed in the same direction that said display panel is installed into said display unit body.

16. The mounting system for a display panel according to claim 6, wherein said plurality of fixtures are identically formed.

* * * * *